April 20, 1954     R. F. WORLIDGE     2,675,824
VALVE FOR CONTROLLING THE FLOW OF FLUIDS
Filed Feb. 2, 1953
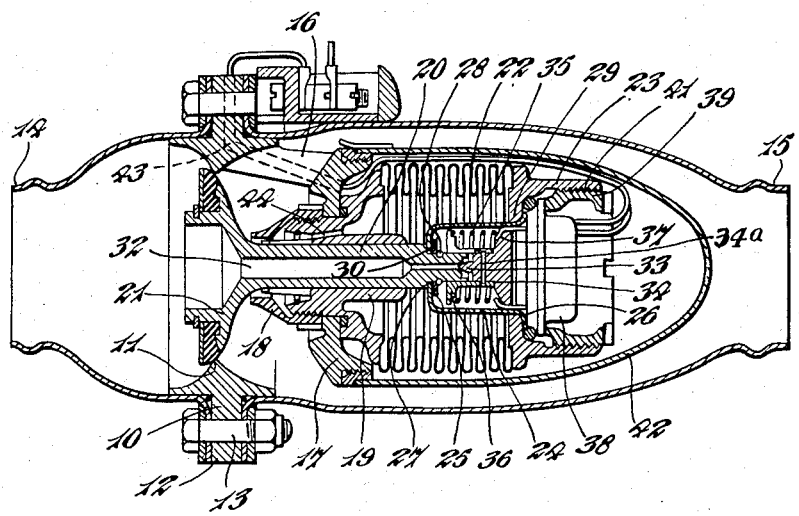
INVENTOR
RONALD F. WORLIDGE Patented Apr. 20, 1954

2,675,824

UNITED STATES PATENT OFFICE 2,675,824

VALVE FOR CONTROLLING THE FLOW OF FLUIDS

Ronald F. Worlidge, Lower Parkstone, England, assignor to Flight Refuelling Limited, Tarrant Rushton Airfield, near Blandford, England Application February 2, 1953, Serial No. 334,412

Claims priority, application Great Britain February 11, 1952

5 Claims. (Cl. 137—222)

This invention relates to valves for controlling a unidirectional flow of fluid in a conduit, the valve being of the kind in which a main valve, through which the main flow of fluid takes place, is actuated by the controlled fluid in accordance with the position of a pilot valve, the controlled fluid tending to open the main valve when the pilot valve is open, and to close the main valve when the pilot valve is closed.

The object of the present invention is to provide a compact and efficient valve for the purpose set forth.

According to the invention, a valve of the kind referred to comprises an annular seat member adapted to be interposed in the line of a conduit so that fluid flowing in the conduit passes through it, a poppet type valve closure member cooperating with the seat member, a fluid-tight casing in the conduit co-axial with and fixed in relation to the valve seat member, a fluid-pressure responsive member of larger area than the valve closure member dividing the said casing into two chambers and connected by a stem to the valve closure member, a restricted passage admitting fluid to one of said chambers from the side of the valve seat member on which fluid pressure exerts an opening thrust on the valve closure member to apply a thrust to the fluid pressure responsive member in a direction to close the valve, a pilot valve controlling a passage leading from the said chamber to the other side of the valve seat member, and a passage connecting the other chamber in the casing to the exterior of the conduit.

The invention is hereinafter described with reference to the accompanying drawing, the single figure of which shows, in longitudinal section, one form of valve according to the invention.

Referring to the drawing, an annular valve seat member in the form of a ring 10 is provided, having a valve seat 11 and an external flange 12 adapted to be clamped by bolts 13 between external flanges on two pipe sections 14 and 15. The ring 10 has projecting from one side a plurality of slightly inwardly inclined legs 16 which carry a second ring 17 of smaller diameter, spaced somewhat from the valve seat ring 10 in an axial direction. Mounted in the second ring 17, and clamped to it by a nut 18, is a valve guide 19 in which is slidably mounted the stem 20 of a mush-room valve 21, the edge of the head of which is adapted to engage with the valve seat 11. On the side of the second ring 17 remote from the valve seat ring 10, the valve guide 19 is formed to provide a suitable attachment for one end of a resilient metal bellows 22, the other end of which is secured to the base of a cup-like end member 23 which is in turn fixedly attached to the valve stem 20 by a perforated sleeve 24 having inturned and outturned flanges 25 and 26 one at each end. The inturned flange 25 is located on the valve stem 20 against a shoulder 27 thereon by a washer 30 and a spring ring 28 fitting in a groove on the valve stem, and the out-turned flange 26 is clamped against a flange 29 surrounding a central opening in the base of the cup-like end member 23, as hereinafter described. The perforated sleeve 24 thus provides a rigid connection between the end of the bellows 22 remote from the ring 17 and the valve 21, through which movement of the said end of the bellows is transmitted to the valve. The parts are assembled in such a way that the bellows 22 is slightly compressed when the valve is closed, so that the bellows, in tending to expand to its normal length exerts a closing force on the mush-room valve 21. The valve stem 20 is tubular, the passage 32 therethrough being controlled by a pilot valve 33 seating in the end of said passage 32 remote from the mush-room valve head and guided by a slotted sleeve 34 secured by a cross pin 34a to the pilot valve 33 and fitting over the end of the valve stem 20. The pilot valve 33 is urged to its closed position by a spring 35 acting between a flange 36 on the slotted sleeve 34 and a flange 37 on an abutment ring located in the sleeve 24, and is opened by a solenoid unit 38 secured in the cup-like end member 23 by a ring nut 39 engaging an internal screw thread 41 in the said end member, the external flange 26 of the flanged sleeve 24 being clamped between the solenoid unit 38 and the base of the end member 23. The bellows 22 and solenoid unit 38 are enclosed in a somewhat streamlined casing 42 the open end of which has a screw-threaded engagement with the second ring 17, the interior of the bellows 22 constituting a first chamber within said casing and the space outside the bellows constituting a second chamber in said casing. The electrical connections for the solenoid are led through a passage 43 in one of the legs 16 connecting the two rings 10 and 17, which passage 43 also serves to connect the second said chamber in the casing 42 to the atmosphere. A restricted passage 44 in the valve guide member 19 connects the interior of the bellows 22 to the interior of the pipe section 15 in which the casing 42 is located. Both pipe sections 14 and 15, adjacent the valve seat ring 10, are larger in diameter than the conduit in which the valve is fitted, the pipe section 15 being large enough to provide an annular passage around the casing 42 of substantially equal cross-sectional area to the said conduit. The said sections decreasing in diameter towards their outer ends so that the said ends conform in diameter to the conduit to which they are fitted.

In use, the valve is interposed in a conduit in which there is a unidirectional flow of fluid due to the supply of fluid under pressure to one end of the conduit, the valve being so positioned that the casing 42 is on the upstream side of the valve seat. So long as the pilot valve 33 is closed, fluid entering the bellows 22 through the restricted passage 44 maintains a pressure in the bellows equal to that in the conduit, and, as the bellows has a larger effective area than the mush-room valve 21, this pressure, acting on the bellows, keeps the valve closed. Opening of the pilot valve 33, however, allows the fluid to escape freely from the bellows 22, through the apertures in the sleeve 24, the slot in the sleeve 34, the pilot valve 33 and the passage 32, to the downstream side of the valve, thus reducing the pressure in the bellows, and allowing the fluid pressure, acting on the mush-room valve 21, to open the valve.

I claim:

1. A valve for controlling a unidirectional flow of fluid in a conduit, comprising an annular seat member adapted to be interposed in the line of the conduit so that fluid flowing in the conduit passes through it, a poppet type valve closure member co-operating with the seat member, a fluid-tight casing in the conduit co-axial with and fixed in relation to the valve seat member, a fluid-pressure responsive member of larger area than the valve closure member dividing the said casing into first and second chambers, means connecting said fluid pressure responsive member to the valve closure member, a restricted passage admitting fluid to said first chamber from the side of the valve seat member on which fluid pressure exerts an opening thrust on the valve to apply a thrust to the fluid pressure responsive member in a direction to close the valve, a pilot valve controlling a passage leading from the said first chamber to the other side of the valve seat member, a passage connecting the second chamber in the casing to the exterior of the conduit and means to actuate said pilot valve.

2. A valve according to claim 1, wherein the valve closure member is urged towards its seat by resilient means.

3. A valve according to claim 2, wherein the resilient means comprises a resilient metal bellows which constitutes the fluid-pressure responsive member.

4. A valve according to claim 1, wherein the pilot valve actuating means comprises a solenoid.

5. A valve according to claim 1, wherein the valve seat member is a ring adapted for mounting between two conduit sections, the said ring being formed with a flange for bolting to co-operating flanges on the conduit sections.

References Cited in the file of this patent

UNITED STATES PATENTS

| Number | Name | Date |
| --- | --- | --- |
| 1,422,212 | Larner | July 11, 1922 |
| 2,278,004 | Thompson | Mar. 31, 1942 |
| 2,291,101 | Papulski | July 28, 1942 |